United States Patent [19]

Ruddy et al.

[11] Patent Number: 5,897,641
[45] Date of Patent: Apr. 27, 1999

[54] APPLICATION OF LOG RECORDS TO DATA COMPRESSED WITH DIFFERENT ENCODING SCHEME

[75] Inventors: James Alan Ruddy, Gilroy; Kalpana Shyam, Los Altos; Gary H. Sockut, San Jose; Julie Ann Watts, Morgan Hill, all of Calif.

[73] Assignee: International Business Machines Corporation, Armonk, N.Y.

[21] Appl. No.: 08/854,937

[22] Filed: May 13, 1997

[51] Int. Cl.[6] ...................................................... G06F 17/30
[52] U.S. Cl. ............................ 707/202; 707/100; 707/101
[58] Field of Search .................................... 707/100, 101, 707/1, 2, 202; 341/51

[56] References Cited

U.S. PATENT DOCUMENTS 5,341,498  8/1994  Connor et al. ........................... 395/600
5,485,608  1/1996  Lomet et al. ............................ 395/600
5,550,976  8/1996  Henderson et al. ............... 395/200.06
5,630,092  5/1997  Carreiro et al. ......................... 395/438
5,696,967  12/1997  Hayashi et al. .......................... 395/618
5,752,247  5/1998  Henderson ............................... 707/102

*Primary Examiner*—Paul V. Kulik
*Assistant Examiner*—Michael J. Wallace, Jr.
*Attorney, Agent, or Firm*—Gray Cary Ware Freidenrich

[57] ABSTRACT

A primary database's log records are used to update a second database that has a different encoding scheme than the log record and the primary database. This encoding scheme, for example, may involve compression, encryption, or another data transformation. First, a stale encoded data record from the second database is identified. This data record is one whose counterpart in the primary database has been updated in the primary database and where update has been logged. The stale data record is modified to reflect its contents as encoded by the first encoding scheme rather than the second. Then, the logged change is applied to update the modified record. The updated record is then decoded and subsequently re-encoded according to the second encoding scheme. This record is then stored in the second database replacing the stale second data record.

24 Claims, 3 Drawing Sheets

APPLICATION OF LOG RECORDS TO DATA COMPRESSED WITH DIFFERENT ENCODING SCHEME

BACKGROUND OF THE INVENTION

1. Field of the Invention

The present invention relates to the storage and maintenance of data in databases. More particularly, the invention concerns the use of a primary database's log records to update a secondary database that has a different encoding scheme than the primary database.

2. Description of the Related Art

Databases & Log Records

Computers are especially useful to store, search, and analyze large amounts of data, too immense for hand recording. Computer databases typically store data using a non-volatile storage device such as magnetic disk drive, magnetic tape, and/or various optical storage formats.

Adding data to a database is non-complicated, since the data can simply be appended to the database. However, it is more complicated to change data, insert data, or delete data. These functions are aided by using log records. One function of log records is to store "updates" to the database, where one or more data records are changed. Log records also store "insertions" to the database, where one or more data entries are inserted into the database. Likewise, log records store "deletions" to the database, where one or more data entries are deleted from the database. As an example, one well known logging technique is "write ahead logging".

Another beneficial component of most databases is a buffer, comprising a fast-access volatile memory that first receives any changes to the database. In some systems, such as DB2 databases, changes stored in the buffer are not brought to the log record until the user issues a "commit" instruction. At this point, the buffered database changes are stored in the log record and deleted from the buffer. Such a buffer may be known as a "log buffer".

Data Compression

In addition to log records, data compression is another feature that improves the efficiency of databases. Rather than simply storing data exactly as received from a user, data can be stored in a compressed format. Often, this compression is achieved by substituting shorter codes for lengthier data that frequently occur in the database. As a simple example, each occurrence of the address "1000 Maple Street" may be represented in the database by "*". The stored database is therefore considerably shorter, since each occurrence of "1000 Maple Street" is reduced to "*". Translations between expanded data and compressed codes are stored in a "compression/decompression dictionary".

Data compression is frequently applied to the database as well as its log records. The database and the similarly compressed log records are entirely compatible with each other, both exhibiting reduced storage space by virtue of their compression.

A number of situations can arise, however, where log records of one format must be applied to data compressed with a different format. One situation occurs when reorganizing data by creating a separate reorganized copy of the data, called a "shadow" copy. If the shadow copy is created with a different encoding scheme, compatibility problems arise when applying log records of the original copy to update the shadow copy. A similar compatibility problem occurs in systems that maintain synchronized data replicas having different encoding schemes. Still another example is the use of log records having one format to recover data from an image copy that was originally made when a different compression format was in effect.

As shown above, a number of compatibility issues result from copying, reorganizing, or otherwise modifying an original database while continuing to log changes to the original database. Many systems address this problem by simply taking the data off-line, modifying it as desired, rebuilding the compression/decompression dictionary, and then rewriting the data to storage. This is an extremely time consuming process, however, and many database management systems ("DBMSs") cannot tolerate such lengthy periods of data unavailability. For example, data must be available constantly in DBMSs such as ATMs, catalog sales, stock brokerage, businesses with data users spanning many time zones across the world, etc.

For these DBMSs, any database modification must be performed while the original data remains on-line, and changes are logged to the first database. These systems, then, are still perplexed when attempting to use the first database's log records to update the non-compatible second database.

SUMMARY OF THE INVENTION

Broadly, the present invention concerns use of a primary database's log records to update a secondary database that has a different encoding scheme than the primary database. This encoding scheme may involve compression, encryption, NLS transformation or any other data transformation.

First, a "stale" encoded data record from the secondary database is identified. This data record is "stale" because its counterpart in the primary database has been updated. This includes a record of the update being made on the log. The stale data record is modified to reflect its contents as encoded by the first encoding scheme rather than the second. Then, the logged change is applied to update the modified record. The updated record is then decoded and subsequently re-encoded according to the second encoding scheme. This record is then stored in the secondary database replacing the stale second data record.

Accordingly, in one embodiment, the invention may be implemented to provide a method of using a primary database's log records to update a secondary database that has a different encoding scheme than the primary database. A more particular example of this method follows. First, the log record is used to identify an update to a first data record in the primary database. Contents of the log record are encoded according to a first encoding scheme, which is also used to encode data of the primary database. The secondary database is encoded using a second encoding scheme, different than the first. Next, a second data record is located in the secondary database, this record corresponding to the first data record. The second data record is decoded using the reverse of the second encoding scheme. The unencoded data record is then encoded using the first encoding scheme. The result is a version of the second data entry encoded for compatibility with the primary database.

The log record is then consulted to obtain the logged update to the first data record. This update is applied to the decoded, re-encoded second data record, described above. This record is then decoded using the reverse of the first encoding scheme, and the decoded value encoded again using the second encoding scheme. The result is stored in the secondary database in replacement for the second data record.

In addition to the foregoing method, the invention may also be implemented to provide an apparatus such as a computer database system suitable to implement the foregoing method. In still another embodiment, the invention may be implemented to provide a programmed product comprising signal-bearing media tangibly embodying a program of machine-readable instructions executable by a digital data processing apparatus to use of a primary database's log records to update a secondary database that has a different encoding scheme than the primary database.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections

Figure 1:
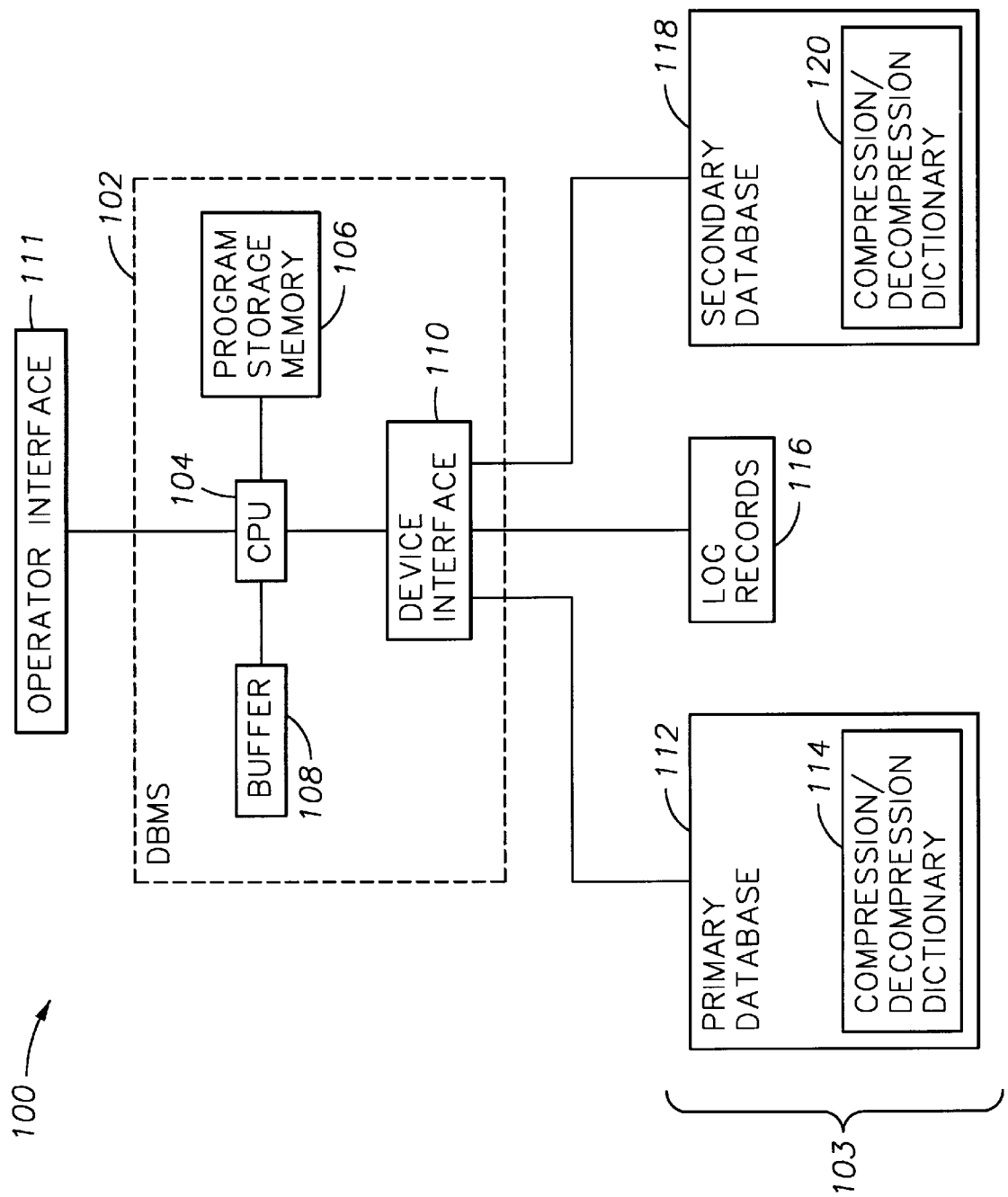
FIG. 1 is a block diagram showing the hardware components and interconnections of an apparatus according to one embodiment of the invention.

One aspect of the invention concerns a database system, which may be embodied by various hardware components and interconnections. One example is shown by the database system 100 of FIG. 1. Generally, the system 100 includes a DBMS 102 and various data storage facilities 103.

DBMS

Generally, the DBMS 102 manages data stored in the primary database 112, log records 116, and secondary database 118. The DBMS 102 may perform a number of other functions as well, such as running various application programs.

The DBMS 102 includes a CPU 104, coupled to a program storage memory 106, buffer 108, device interface 110, and operator interface 111. The DBMS 102 may comprise almost any digital data processing apparatus capable of managing the desired size and type of data. For example, the DBMS 102 may comprise an IBM S/390 mainframe, a personal computer, IBM AS/400 server, or another suitable machine.

The program storage memory 106 stores machine-readable programming instructions, which are executed by the CPU 104 in order to run programs. In the present example, one of these programs is a database management program such as IBM's DB2. Although the memory 106 preferably comprises fast-access memory such as random access memory ("RAM"), a number of different program storage materials may be used, as discussed in greater detail below.

The buffer 108 receives and temporarily stores new information bound for one of the data storage facilities 103. Buffered log records are written to the data storage facility 103 no later than issuance of a commit instruction, which may be given by an operator. At some conceived time after the related log has been written to the data storage facility 103, the actual data changes may be written to the data storage facility 103 to directly update the database. Advantageously, the writing of data to the data storage facility 103 may be asynchronous to the progress of an overlying application program. The buffer 108 preferably comprises fast-access memory such as RAM, although many different types of storage may be used.

The device interface 110 facilitates communications between the CPU 104 and the data storage facilities 103. The data interface 110, for example, may comprise an IBM device adapter card for each different device constituting the data storage facilities 103.

The operator interface 111 provides an interface between the CPU 104 and a human operator (not shown). In this respect, the interface 111 provides the operator with human-readable output, such as visible text/graphics or audible data. This aspect of the interface 111 is preferably provided by a CRT video monitor. A different aspect of the interface 111 provides the CPU 104 with machine-readable input, preferably in the form of electrical or electromagnetic signals. This aspect of the interface 111 is preferably provided by a computer keyboard.

Data Storage Facilities

The data storage facilities 103 include a primary database 112, log records 116, and a secondary database 118. Although shown separately for ease of explanation, one or more of these items 112/116/118 may be consolidated on a single device. As an example, these data storage device(s) may comprise one or more magnetic data storage devices, magnetic tape storage, writable optical storage, or a combination of the foregoing.

Both the primary database 112 and secondary database 118 include respective compression/decompression dictionaries 114, 120. Each compression/decompression dictionary provides a translation between encoded values actually stored in the database and the data represented thereby. In the present example, the primary database 112 uses a first encoding scheme, and the secondary database 118 uses a second encoding scheme, different from the first. Each scheme may involve data compression, encryption, NLS transformation, or any another type of data transformation.

As one alternative, one of the databases 112/118 may refrain from performing any encoding, if desired. In this embodiment, the non-encoding database's encoding scheme is simply no-operation, called a "no-op".

Operation

In addition to the various hardware embodiments described above, a different aspect of the invention concerns a method for using a primary database's log records to update a secondary database that has a different encoding scheme than the primary database.

Signal-Bearing Media

Such a method may be implemented, for example, by operating the host to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform method steps to use a primary database's log records to update a secondary database that has a different encoding scheme than the primary database.

Figure 2:
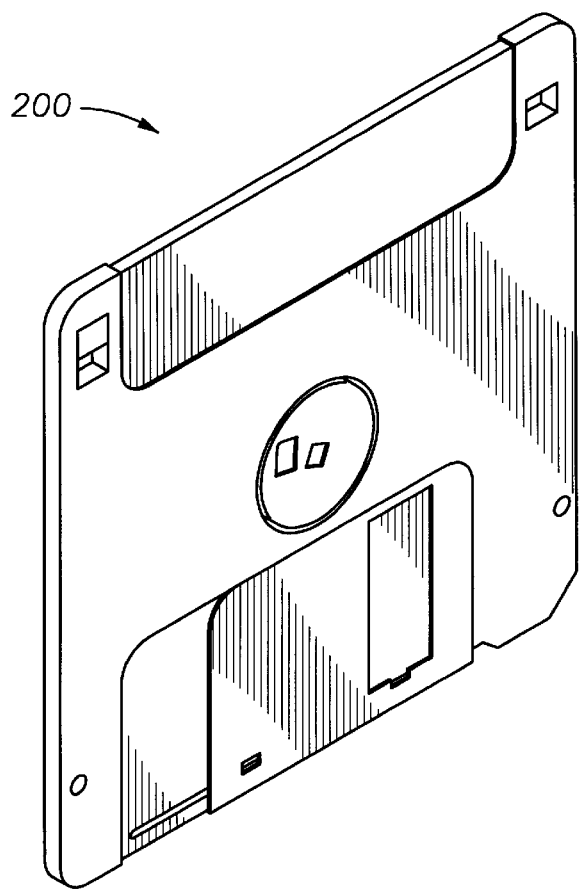
FIG. 2 is a diagram showing an illustrative article of manufacture according to one embodiment of the invention.

This signal-bearing media may comprise, for example, RAM provided by the program storage memory 106. Alternatively, the instructions may be contained in another signal-bearing media, such as a portable magnetic data storage diskette 200 (FIG. 2). Whether contained in the memory 106, a portable medium such as the diskette 200, or elsewhere, the instructions may instead be stored on another type of data storage medium such as DASD storage (e.g., a conventional "hard drive" or a RAID array), magnetic tape, electronic read-only memory (e.g., CD-ROM or WORM), optical storage device (e.g. WORM), paper "punch" cards, or other signal-bearing media including transmission media such as digital and analog and communication links and wireless. In an illustrative embodiment of the invention, the machine-readable instructions may comprise lines of compiled code written in PLX, C, or another suitable language.

Operational Sequence

Figure 3:
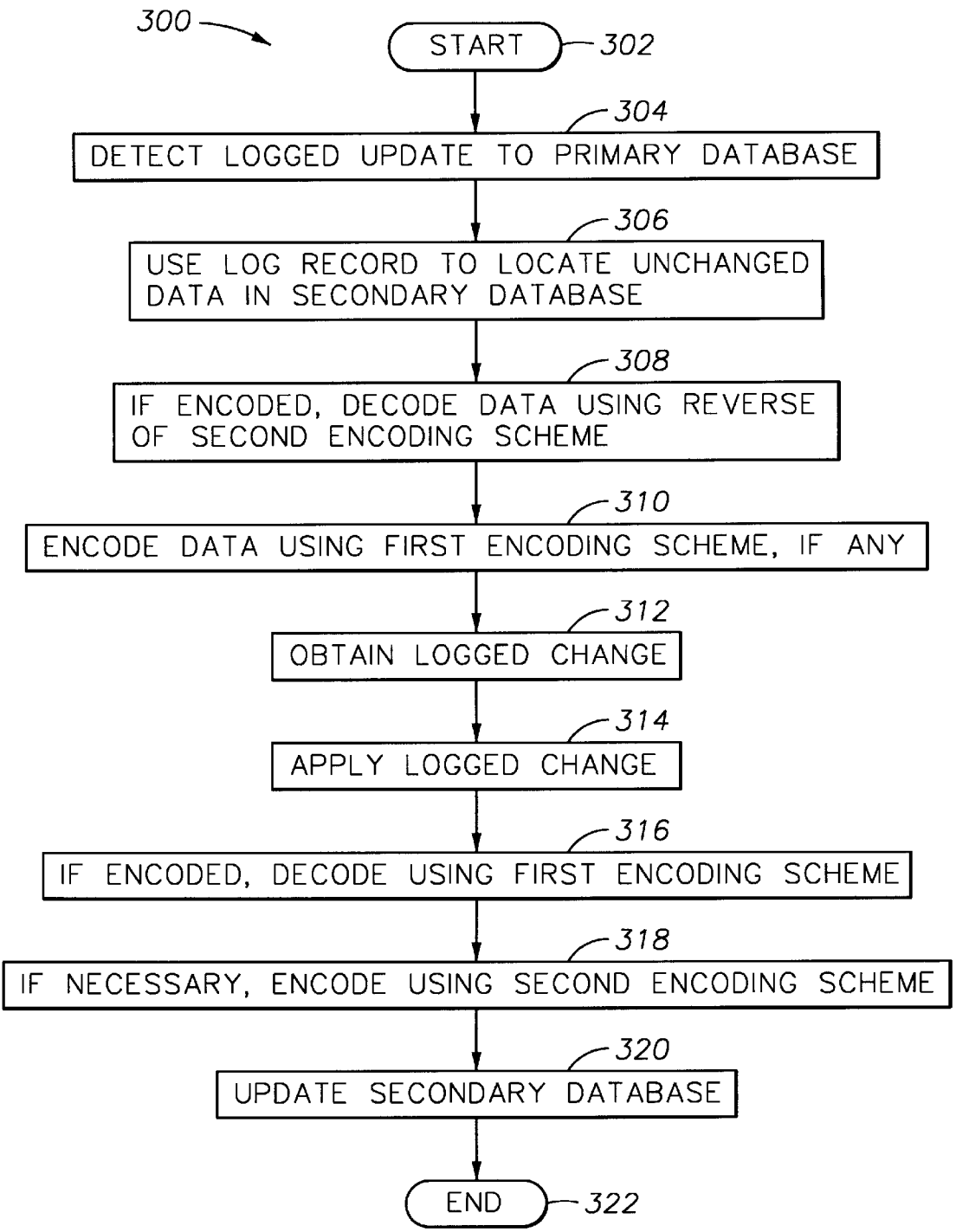
FIG. 3 is a flowchart showing an operational sequence using a primary database's log records to update a secondary database that has a different encoding scheme than the primary database, where the log record contains changes to the primary database, according to one embodiment of the invention.

FIG. 3 shows a sequence of method steps 300 to illustrate one example of the method aspect of the present invention. For ease of explanation, but without any limitation intended thereby, the example of FIG. 3 is described in the context of the system 100 described above. To provide a helpful example, the sequence 300 is also described in the context of the data storage scenario shown in FIG. 4, described as follows.

Data Storage Scenario

Figure 4:
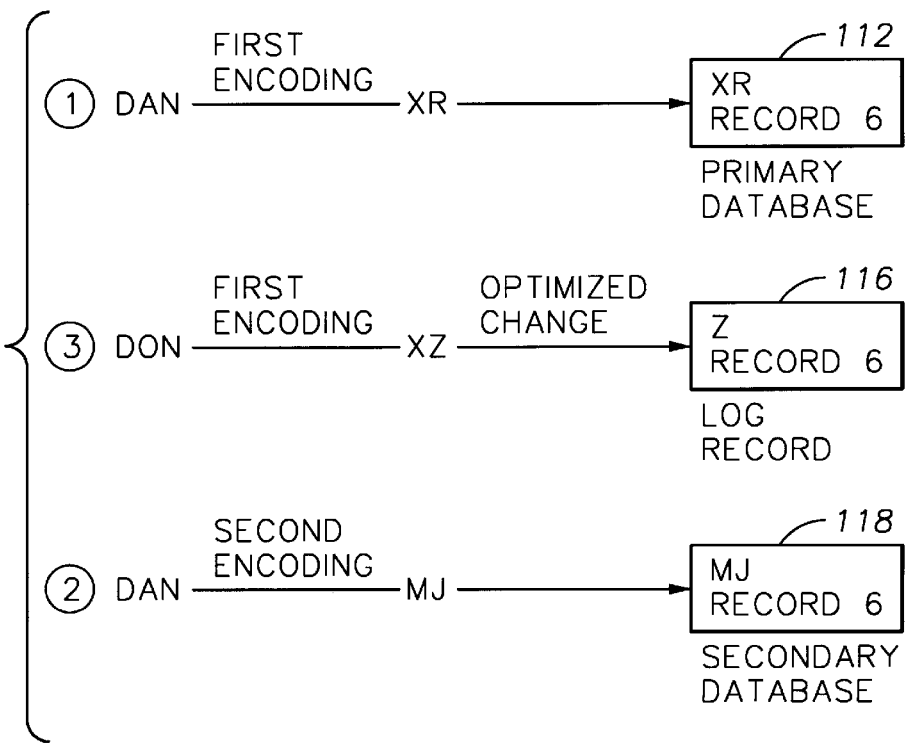
FIG. 4 is a diagram showing contents of a primary database, a log record of the primary database, and a secondary database that has a different encoding scheme than the primary database, according to one embodiment of the invention.

In the example of FIG. 4, the user provides the data "DAN" for storage in the primary database 112. According to the first encoding scheme, as specified in the first compression/decompression dictionary 114, "DAN" is encoded as "XR". Thus, "XR" is actually stored in the primary database 112. In the present example, "XR" is stored in a position identified by "record 6".

The secondary database 118 is formed after the primary database 112. The secondary database 118 may be formed in a number of different ways. For example, the secondary database 118: (1) may be generated by reorganizing data of the primary database 112, (2) may comprise a synchronized data replica of the primary database 112, or (3) may comprise an image copy of the primary database 112 for possible recovering the primary database 112 in the event of its failure. Due to the second encoding scheme, the data "DAN" stored in the secondary database 118 is represented as "MJ", rather than "XR".

The value "MJ" is not necessarily stored in the record number six of the secondary database 118. However, this value is preferably associated with a link to the corresponding value in the primary database 112. This link may comprise, for example, a numeric or alphanumeric indication of the position of the corresponding value in the primary database 112. In the example of FIG. 4, the link references "record 6". Preferably, this link is stored apart from the data "MJ", in case the secondary database 118 is ultimately used to replace the primary database 112, e.g., in a reorganization operation.

Some time after "MJ" is stored in the secondary database 118, the underlying data "DAN" represented by "XR" in the primary database is updated. In particular, "DAN" is replaced with "DON". Using the first encoding scheme, "DON" would be encoded into "XZ". This change is then represented in the log record 116. However, rather than storing the entire sequence "XZ", the log record 116 abbreviates the change by storing the difference between the data, namely "Z". The "Z" may be referred to as the "optimized difference value". The optimized difference value "Z" indicates that a "Z" replaces the "R" of the originally stored data "XR". The optimized difference value "Z" is also associated with link correlating the optimized difference value to the updated value "XR" in the primary database 112. In the present example, this information comprises a stored value "record 6".

In the foregoing scenario, then, logged changes to one database are inapplicable to another database due to different encoding schemes, thus providing the following opportunity to apply and describe the operational sequence 300. In the foregoing example, data such as "DAN", "DON", "XR", "Z" and other similar data referenced above are used to provide a convenient shorthand for lengthier data records, portions of data records or even groups of multiple data records.

Details of Operational Sequence

Referring to FIG. 3, after the sequence 300 begins in task 302, task 304 detects a logged update to the primary database 112. In the present example, this occurs when the DBMS 102 is reviewing the log records 116 to update the secondary database 118, and detects the change "Z" to "record 6" of the primary database 112.

Following task 304, task 306 uses the detected log record to locate corresponding unchanged data in the secondary database 118. In this example, the detected change "Z" corresponds to "MJ" in the secondary database 118, as both of these values stem from "record 6" in the primary database 112. Having located this data in the secondary database 118, task 308 then decodes the data by applying the second encoding scheme in reverse. In the illustrated example, task 308 produces "DAN" from "MJ".

After task 308, task 310 encodes the data using the first encoding scheme. In the present example, "DAN" is encoded to provide "XR". Then, task 312 obtains the logged change, originally detected in task 304. This change is represented by "Z" in the present example. Accordingly, task 314 applies the logged change to the decoded, re-encoded data from the secondary database 118, thereby producing an image of the data as it now appears in the primary database, based upon the log record and the data as it appears in the secondary database 112. In the present example, task 314 updates "XR" to yield "XZ".

Next, task 316 decodes the value from task 314 using the first encoding scheme. In the illustrated example, decoding "XZ" yields "DON". Task 318 then encodes the decoded value using the second encoding scheme. In the present example, this provides "ML" (not shown in FIG. 4).

Following task 318, task 320 updates the secondary database 118. This is achieved by storing the encoded value of task 318, and "linking" this data to the updated data in the secondary database 118. In one embodiment, task 320 may store the entire encoded value; in another embodiment, task 320 may store an optimized version of the encoded value.

"Linking" the encoded value to the secondary database 118 may be performed in a number of different ways. For example, the unabbreviated data of task 320 may be stored in substitution for the updated data in the secondary database 118. Using the illustrated example, this approach stores "ML" in the secondary database 118 in substitution for "MJ". Alternatively, the unabbreviated data of task 320 may be stored in a log record separate from the secondary database 118, and this value linked to the database by pointers, data fields, or another associative technique. Using an example, "ML" may be stored in a log record, and this record associated with the "MJ" entry of the secondary database 118. As another alternative, an optimized value "L" may be stored in a log record, and this record associated with the "MJ" value of the secondary database 118.

After task 320 updates the secondary database 118, the routine 300 ends in task 322.

Exemplary Code

Table 1 (below) provides a listing of pseudocode that illustrates one exemplary implementation of the routine 300.

TABLE 1

```
If Full logging & Full REDO present
    Use REDO portion of log record
Else
    If Full logging
        Use UNDO portion of log record
    Else
        If log record compressed
            & keep dictionary for this part
                leave compressed
        Else
            decompress too
Get old record
If need data
    & data record not compressed
    & log record IS compressed
        compress data with old dictionary.
If need data
    Full logging & Full UNDO Present
        Overlay record with REDO bytes from log record
    If overlayed record is compressed
        & kept dictionary for this part
        decompress overlayed record with new dictionary.
    Else
        decompress overlayed record with old dictionary.
    If record has editproc, decode with edit proc.
    Update Record
```

Other Embodiments

While there have been shown what are presently considered to be preferred embodiments of the invention, it will be apparent to those skilled in the art that various changes and modifications can be made herein without departing from the scope of the invention as defined by the appended claims.

Examples of modifications of the foregoing description are provided below.

Optimized Change And Original Data Logged

As an example of one alternative embodiment, the routine 300 may be adapted for use with log records that contain a data entry along with an optimized change to that data. Using the example of FIG. 4, this embodiment is applicable where the log record contains "Z" (the update) along with "XR" (the record to which the update applies).

In this embodiment, the log record already provides the original record (called a "full un-do"), formatted according to the first encoding scheme. Therefore, the routine 300 can eliminate tasks 306–310. After detecting the logged change in task 304, task 312 obtains the logged change ("Z") from the log record, then task 314 applies the logged change to the original data ("XR") also obtained from the log record. In the illustrated example, this produces the value "XZ". The routine continues with tasks 316–322 as described above.

Changed Data And Original Data Logged

As another example of an alternative embodiment, the routine 300 may be adapted for use with log records that contain an original data value along with the same data after being updated. Using the example of FIG. 4, this embodiment is applicable where the log record contains "XZ" (the updated data) along with "XR" (the record before updating). This embodiment is also applicable where the log record contains a new insert to the primary database 112, rather than an update to an existing record.

In this embodiment, the log record already provides the updated (or inserted) record in its entirety (i.e., a full re-do), formatted according to the first encoding scheme. Therefore, the routine 300 can eliminate tasks 306–310 and 314. Thus, after obtaining the logged change or insert ("XZ") in task 310, task 316 decodes this data according to the first encoding scheme. In the illustrated example, this provides a value "DON". Tasks 318–322 then continue as described above.

Table 2 (below) provides a listing of pseudocode that illustrates one exemplary implementation of the foregoing embodiment.

TABLE 2

```
When Insert
    If log record is compressed
        & kept dictionary for this part
            decompress record with new dictionary.
    Else
        decompress record with old dictionary.
    If record has editproc, decode with edit proc.
    Insert record
```

What is claimed is:

1. A method of applying log records of a first database to a second database, the first database containing data records encoded according to a first encoding scheme, the second database containing data records encoded according to a second encoding scheme different than the first encoding scheme, the log records comprising changes to the data of the first database, the changes encoded according to the first encoding scheme, the method comprising:

identifying an encoded update to an original encoded data record contained in the first database, the encoded update being stored in the log record, the encoded update and the original encoded data record being encoded according to the first encoding scheme;

locating a second encoded data record in the second database corresponding to the original encoded data record, the second encoded data record being encoded according to the second encoding scheme;

unencoding the second encoded data record by reversing the second encoding scheme to yield a first unencoded data record;

encoding the first unencoded data record using the first encoding scheme to yield a third encoded data record;

applying the encoded update to the third encoded data record to provide a first updated encoded data record;

unencoding the first updated encoded data record by reversing the first encoding scheme to yield a second unencoded data record;

applying the second encoding scheme to the second unencoded data record to yield a second updated encoded data record; and updating the second encoded data record by storing a representation of the second updated data record and linking the representation to the second encoded data record.

2. The method of claim 1, updating the encoded second data record being performed by storing an optimized version of the second updated encoded data in a log record associated with the second database.

3. The method of claim 1, locating the second encoded data record in the second database being performed prior to identifying the encoded update to the first encoded data record.

4. A method of applying log records of a first database to a second database, the first database containing data records encoded according to a first encoding scheme, the second database containing data records encoded according to a second encoding scheme different than the first encoding scheme, the log records comprising changes to the data of the first database, the changes encoded according to the first encoding scheme, the method comprising:

obtaining from the log record a first encoded data record and an encoded update to the original encoded data record, the first encoded data record and the encoded update being encoded according to the first encoding scheme, the first encoded data record representing an original data record contained in the first database, said original data record corresponding to a second encoded data record in the second database;

applying the encoded update to the first encoded data record to provide a first updated encoded data record;

unencoding the first updated encoded data record by applying reversing the first encoding scheme to yield a first encoded data record;

applying the second encoding scheme to the first unencoded data record to yield a second updated encoded data record; and updating the second encoded data record by storing a representation of the second updated encoded data record and linking the representation to the second encoded data record.

5. The method of claim 4, updating the encoded second data record being performed by storing an optimized version of the second updated encoded data in a log record associated with the second database.

6. A method of applying log records of a first database to a second database, the first database containing data records encoded according to a first encoding scheme, the second database containing data records encoded according to a second encoding scheme different than the first encoding scheme, the log records comprising changes to the data of the first database, the changes encoded according to the first encoding scheme, the method comprising:

obtaining from a log record a first updated encoded data record representing an updated version of an original encoded date record contained in the first database, the first updated encoded data record being encoded according to the first encoding scheme;

unencoding the first updated encoded data record by reversing the first encoding scheme to yield a first unencoded data record;

applying the second encoding scheme to the first unencoded data record to yield a second updated encoded data record; and updating a second original encoded data record contained in the second database and corresponding to the original encoded data record, said updating being performed by storing a representation of the second updated encoded data record and linking the representation to the second original encoded data record.

7. The method of claim 6, updating the encoded second data record being performed by storing an optimized version of the second updated encoded data in a log record associated with the second database.

8. An article of manufacture comprising signal-bearing media tangibly embodying a program of machine-readable instructions executable by a digital processing apparatus to perform a method for applying logged changes to a first encoded database to a second encoded database, said method comprising:

identifying an encoded update to an original encoded data record contained in the first database, the encoded update being stored in the log record, the encoded update and the original encoded data record being encoded according to a first encoding scheme;

locating a second encoded data record in the second database corresponding to the original encoded data record, the second encoded data record being encoded according to a second encoding scheme;

unencoding the second encoded data record by reversing the second encoding scheme to yield a first unencoded data record;

encoding the first unencoded data record using the first encoding scheme to yield a third encoded data record;

applying the encoded update to the third encoded data record to provide a first updated encoded data record;

encoding the first updated encoded data record by reversing the first encoding scheme to yield a second unencoded data record;

applying the second encoding scheme to the second unencoded data record to yield a second updated encoded data record; and updating the second encoded data record by storing a representation of the second updated date record and linking the representation to the second encoded data record.

9. The article of manufacture of claim 8, locating the second encoded data record in the second database being performed prior to identifying the encoded update to the first encoded data record.

10. The article of manufacture of claim 8, updating the encoded second data record being performed by storing an optimized version of the second updated encoded data in a log record to the second database.

11. An article of manufacture comprising signal-bearing media tangibly embodying a program of machine-readable instructions executable by a digital processing apparatus to perform a method for applying logged changes to a first encoded database to a second encoded database, said method comprising:

obtaining from the log record a first encoded data record and an encoded update to the original encoded data record, the first encoded data record and the encoded update being encoded according to a first encoding scheme, the first encoded data record representing an original data record contained in the first database, said original data record corresponding to a second encoded data record in the second database;

applying the encoded update to the first encoded data record to provide a first updated encoded data record;

unencoding the first updated encoded data record by applying reversing the first encoding scheme to yield a first unencoded data record;

applying a second encoding scheme to the first unencoded data record to yield a second updated encoded data record; and updating the second encoded data record by storing a representation of the second updated encoded data record and linking the representation to the second encoded data record.

12. The article of manufacture of claim 11, updating the encoded second data record being performed by storing an optimized version of the second updated encoded data in a log record to the second database.

13. An article of manufacture comprising signal-bearing media tangibly embodying a program of machine-readable instructions executable by a digital processing apparatus to perform a method for applying logged changes to a first encoded database to a second encoded database, said method comprising:

obtaining from a log record a first updated encoded data record representing an updated version of an original encoded data record contained in the first database, the first updated encoded data record being encoded according to a first encoding scheme;

unencoding the first updated encoded data record by reversing the first encoding scheme to yield a first unencoded data record;

applying a second encoding scheme to the first unencoded data record to yield a second updated encoded data record; and updating a second original encoded data record contained in the second database and corresponding to the original encoded data record, said updating being performed by storing a representation of the second updated encoded data record and linking the representation to the second original encoded data record.

14. The article of manufacture of claim 13, updating the encoded second data record being performed by storing an optimized version of the second updated encoded data in a log record to the second database.

15. A database management apparatus, comprising:

a host computer; and at least one data storage device coupled to the host;

the host being programmed to perform a method for applying logged changes to a first encoded database to a second encoded database, said method comprising:

identifying an encoded update to an original encoded data record contained in the first database, the encoded update being stored in the log record, the encoded update and the original encoded data record being encoded according to a first encoding scheme;

locating a second encoded data record in the second database corresponding to the original encoded data record, the second encoded data record being encoded according to a second encoding scheme;

unencoding the second encoded date record by reversing the second encoding scheme to yield a first unencoded data record;

encoding the first unencoded data record using the first encoding scheme to yield a third encoded data record;

applying the encoded update to the third encoded data record to provide a first updated encoded data record;

unencoding the first updated encoded data record by reversing the first encoding scheme to yield a second unencoded data record;

applying the second encoding scheme to the second unencoded data record to yield a second updated encoded data record; and updating the second encoded data record by storing a representation of the second updated data record and linking the representation to the second encoded data record.

16. The apparatus of claim 15, locating the second encoded data record in the second database being performed prior to identifying the encoded update to the first encoded data record.

17. The apparatus of claim 15, updating the encoded second data record being performed by storing an optimized version of the second updated encoded data in a log record to the second database.

18. A database management apparatus, comprising:

a host computer; and at least one data storage device coupled to the host;

the host being programmed to perform a method for applying logged changes to a first encoded database to a second encoded database, said method comprising:

obtaining from the log record a first encoded data record and an encoded update to the original encoded data record, the first encoded data record and the encoded update being encoded according to a first encoding scheme, the first encoded data record representing an original data record contained in the first database, said original data record corresponding to a second encoded data record in the second database;

applying the encoded update to the first encoded data record to provide a first updated encoded data record;

unencoding the first updated encoded data record by applying reversing the first encoding scheme to yield a first unencoded data record;

applying a second encoding scheme to the first unencoded data record to yield a second updated encoded data record; and updating the second encoded data record by storing a representation of the second updated encoded data record and linking the representation to the second encoded data record.

19. The apparatus of claim 18, updating the encoded second data record being performed by storing an optimized version of the second updated encoded data in a log record to the second database.

20. A database management apparatus, comprising:

a host computer; and at least one data storage device coupled to the host;

the host being programmed to perform a method for applying logged changes to a first encoded database to a second encoded database, said method comprising:

obtaining from a log record a first updated encoded data record representing an updated version of an original encoded data record contained in the first database, the first updated encoded data record being encoded according to a first encoding scheme;

unencoding the first updated encoded data record by reversing the first encoding scheme to yield a first unencoded data record;

applying a second encoding scheme to the first unencoded data record to yield a second updated encoded data record; and updating a second original encoded data record contained in the second database and corresponding to the original encoded data record, said updating being performed by storing a representation of the second updated encoded data record and linking the representation to the second original encoded data record.

21. The apparatus of claim 20, updating the encoded second data record being performed by storing an optimized version of the second updated encoded data in a log record to the second database.

22. A database management apparatus, comprising:

a host means; and at least one data storage means coupled to the host means;

the host means being programmed to perform a method for applying logged changes to a first encoded database to a second encoded database, said method comprising:

identifying an encoded update to an original encoded data record in the first database, the encoded update being stored in the log record, the encoded update and the original encoded data record being encoded according to a first encoding scheme;

locating a second encoded data record in the second database corresponding to the original encoded data record, the second encoded data record being encoded according to a second encoding scheme;

unencoding the second encoded data record by reversing the second encoding scheme to yield a first unencoded data record;

encoding the first unencoded data record using the first encoding scheme to yield a third encoded data record;

applying the encoded update to the third encoded data record to provide a first updated encoded data record;

unencoding the first updated encoded data record by reversing the first encoding scheme to yield a second unencoded data record;

applying the second encoding scheme to the second unencoded data record to yield a second updated encoded data record; and updating the second encoded data record by storing a representation of the second updated data record and linking the representation to the second encoded data record.

23. A database management apparatus, comprising:

a host means; and at least one data storage means coupled to the host means;

the host means being programmed to perform a method for applying logged changes to a first encoded database to a second encoded database, said method comprising:

obtaining from the log record a first encoded data record and an encoded update to the original encoded data record, the first encoded data record and the encoded update being encoded according to a first encoding scheme, the first encoded data record representing an original data record contained in the first database, said original data record corresponding to a second encoded data record in the second database;

applying the encoded update to the first encoded data record to provide a first updated encoded data record;

unencoding the first updated encoded data record by applying reversing the first encoding scheme to yield a first unencoded data record;

applying a second encoding scheme to the first unencoded data record to yield a second updated encoded data record; and updating the second encoded data record by storing a representation of the second updated encoded data record and linking the representation to the second encoded data record.

24. A database management apparatus, comprising:

a host means; and at least one data storage means coupled to the host means;

the host means being programmed to perform a method for applying logged changes to a first encoded database to a second encoded database, said method comprising:

obtaining from a log record a first updated encoded data record representing an updated version of an original encoded data record contained in the first database, the first updated encoded data record being encoded according to a first encoding scheme;

unencoding the first updated encoded data record by reversing the first encoding scheme to yield a first unencoded data record;

applying a second encoding scheme to the first unencoded data record to yield a second updated encoded data record; and updating a second original encoded data record contained in the second database and corresponding to the original encoded data record, said updating being performed by storing a representation of the second updated encoded data record and linking the representation to the second original encoded data record.

* * * * *